US011256035B2

(12) United States Patent
Jericho (10) Patent No.: US 11,256,035 B2
(45) Date of Patent: Feb. 22, 2022

(54) MULTIPLE PASS FIBER OPTIC ROTARY JOINT

(71) Applicant: Moog Inc., East Aurora, NY (US)

(72) Inventor: Stefan K. Jericho, Halifax (CA)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 16/975,064

(22) PCT Filed: Mar. 1, 2019

(86) PCT No.: PCT/US2019/020386
§ 371 (c)(1),
(2) Date: Aug. 21, 2020

(87) PCT Pub. No.: WO2019/169321
PCT Pub. Date: Sep. 6, 2019

(65) Prior Publication Data
US 2021/0011223 A1 Jan. 14, 2021

Related U.S. Application Data

(60) Provisional application No. 62/637,235, filed on Mar. 1, 2018.

(51) Int. Cl.
*G02B 6/36* (2006.01)
(52) U.S. Cl.
CPC .................... *G02B 6/3604* (2013.01)
(58) Field of Classification Search
CPC .................................................. G02B 6/3604
See application file for complete search history.

(56) References Cited

U.S. PATENT DOCUMENTS

| 4,725,116 A | 2/1988 | Spencer et al. |
| 4,934,783 A | 6/1990 | Jacobson |
| (Continued) | | |

FOREIGN PATENT DOCUMENTS

| CN | 106873080 A | 6/2017 |
| EP | 0488205 A2 | 6/1992 |
| (Continued) | | |

OTHER PUBLICATIONS

European Patent Office, International Search Report and Written Opinion of the ISA/EP from PCT Application No. PCT/US2019/020386, dated Jun. 6, 2019.
(Continued)

*Primary Examiner* — Omar R Rojas
(74) *Attorney, Agent, or Firm* — Harter Secrest & Emery LLP (57) ABSTRACT

A fiber optic rotary connection having first and second elements rotatable relative to each other, the second element having a first subassembly rotatable about a first axis, a second subassembly rotatable about a second axis not parallel to the first axis, and first and second collimators, the first element having third and fourth collimators, one of the second and fourth collimators orientated coincident with the first rotational axis, the other of the second and fourth collimators orientated parallel to the first rotational axis, one of the first and third collimators orientated coincident with the second rotational axis, the other of the first and third collimators orientated parallel to or coincident with the second rotational axis, whereby an optical signal may be transmitted across a rotary interface between the first and second elements in a first optical path and an optical signal may be transmitted across the rotary interface in a second optical path.

20 Claims, 7 Drawing Sheets

(56) References Cited

U.S. PATENT DOCUMENTS

| | | |
|---|---|---|
| 5,588,077 A | 12/1996 | Woodside |
| 5,621,573 A | 4/1997 | Lewis et al. |
| 5,828,146 A | 10/1998 | Lorenz et al. |
| 6,014,484 A | 1/2000 | Duck et al. |
| 6,301,405 B1 | 10/2001 | Keil |
| 6,862,383 B2 | 3/2005 | Kikuchi et al. |
| 7,142,747 B2 | 11/2006 | Oosterhuis et al. |
| 7,515,782 B2 | 4/2009 | Zhang et al. |
| 7,724,996 B2 | 5/2010 | Popp et al. |
| 7,729,571 B2 | 6/2010 | Popp |
| 7,881,569 B2 | 2/2011 | Zhang et al. |
| 8,380,024 B1 | 2/2013 | Zhang et al. |
| 8,611,753 B2 | 12/2013 | Lo et al. |
| 9,046,659 B2 | 6/2015 | Doric |
| 2015/0030284 A1 | 1/2015 | Doleschel et al. |
| 2016/0018599 A1 | 1/2016 | Zhang et al. |

FOREIGN PATENT DOCUMENTS

| | | |
|---|---|---|
| NL | 8400589 A | 9/1985 |
| WO | 85/02270 | 5/1985 |
| WO | 2016168470 A1 | 10/2016 |

OTHER PUBLICATIONS

Model 242 Fiber Optic Rotary Joint, Focal Technologies Inc. Retrieved on Dec. 21, 2017 from https://www.oilandgasonline.com/doc/model-242-fiber-optic-rotary-joint-0001.

Separate Light Path 2x2 Fiber-optic Rotary Joints, Doric Lens. Retrieved on Dec. 21, 2017 from http://doriclenses.com/life-sciences/fiber-optic-rotary-joints/829-separate-light-path-2x2-fiber-optic-rotary-joints-.html and //www.oilandgasonline.com/doc/model-242-fiber-optic-rotary-joint-0001.

MULTIPLE PASS FIBER OPTIC ROTARY JOINT

TECHNICAL FIELD

The present invention relates generally to fiber optic rotary joints, and more particularly a rotary coupling for transmitting optical signals along at least two separate optical transmission paths between two coupling components that are rotatably mounted relative to one another about a common rotational axis.

BACKGROUND ART

Fiber optic rotary joints are well known and allow optical signals to be transferred between fibers located, respectively, on members that are rotating with respect to each other. Single channel devices of this type may be categorized as on-axis rotary joints, when the communicating optical fibers are located along the axis of rotation, and off-axis rotary joints, when the communicating optical fibers are not located on the axis of rotation or centerline. In addition, devices of this type may be categorized as single channel or multi-channel rotary joints.

For example, U.S. Pat. No. 7,142,747 is directed to a fiber optical rotary joint (FORJ) having a housing that defines an internal cavity. The housing is adapted to engage end portions of two bundles of optical fibers with the two bundles disposed on opposite sides of the internal cavity. By appropriately aligning the first and second bundles of optical fibers, respective pairs of the optical fibers of the first and second bundles can communicate across the internal cavity. The first and second bundles of optical fibers generally terminate with an optical collimation array. A collimating lens, such as a ball lens, may be associated with each optical fiber such that the signals emitted by their respective optical fiber are collimated by the ball lens before being launched through the internal cavity. At least one, if not both, of the optical collimation arrays is adapted to rotate about a longitudinal axis relative to the housing. The FORJ is filled with an optically clear fluid for use at high ambient pressures and uses a reversion prism rotating at half the speed of the rotating collimator array.

In many fiber optic systems, more than one fiber and channel is needed, for redundancy, bandwidth, or system cost considerations. Two channels is often the optimal number of fibers, such as in duplex networks or installations demanding a spare channel. For example, U.S. Pat. No. 5,588,077 is directed towards an in-line, two-pass fiber optic rotary joint capable of transmitting two data streams each carried on a separate optical fiber. The entire content of U.S. Pat. No. 5,588,077, issued Dec. 24, 1996, is incorporated herein by reference in its entirety. US Patent Application Publication No. 2015/0030284 is directed to a fiber optic dual-channel rotary joint having two optical paths, with neither of these two optical paths being direct. Optical reflectors are provided in both optical channels and neither optical path is without deflection of the transmitted light.

BRIEF SUMMARY

With parenthetical reference to corresponding parts, portions or surfaces of the disclosed embodiments, merely for the purposes of illustration and not by way of limitation, a non-contacting rotary connection (15, 115) for transmission of optical signals across an interface defined by two relatively-movable members is provided comprising: a first rotary connection element (18, 118); a second rotary connection element (19, 119) configured to rotate about a primary axis (x-x) relative to the first rotary connection element; the second rotary connection element having a first subassembly (33, 134A) configured to rotate about a first rotational axis (31, 131) with rotation of the second rotary connection element about the primary axis (x-x) relative to the first rotary connection element; the second rotary connection element having a second subassembly (34, 134B) configured to rotate about a second rotation axis (30, 132) that is not parallel to the first rotational axis (31, 131) with rotation of the second rotary connection element about the primary axis (x-x) relative to the first rotary connection element; a rotary interface (20, 120) between the first rotary connection element and the second rotary connection element; the second rotary connection element comprising a first collimating lens (21, 124) and a second collimating lens (22, 125); the first rotary connection element comprising a third collimating lens (23, 121) and a fourth collimating lens (24, 122); the first and the third collimating lenses configured to direct an optical signal between each other in a first optical path (P1, P10) across the rotary interface; the second and the fourth collimating lenses configured to direct an optical signal between each other in a second optical path (P2, P20) across the rotary interface; one of the first collimating lens and the third collimating lens (23, 121) orientated coincident with the first rotational axis (31, 131) and the other of the first collimating lens and the third collimating lens (124, 21) orientated parallel to or coincident with the first rotational axis (31, 131); one of the second collimating lens and the fourth collimating lens (24, 122) orientated coincident with the second rotational axis (30, 132) and the other of the second collimating lens and the fourth collimating lens (22, 125) orientated parallel to the second rotational axis (30, 132); whereby an optical signal may be transmitted across the rotary interface directly between the first rotary connection element and the second rotary connection element in the first optical path (P1, P10) and an optical signal may be transmitted across the rotary interface between the first rotary connection element and the second rotary connection element in the second optical path (P2, P20).

The first rotary connection element (18, 118) may be stationary relative to a housing (16) and the second rotary connection element (19, 119) may rotate about the primary axis (x-x) relative to the first rotary connection element. The first rotary connection element may rotate about the primary axis (x-x) and the second rotary connection element may rotate about the primary axis (x-x) at a speed different from the first rotary connection element. The second rotary connection element may be stationary relative to a housing and the first rotary connection element may rotate about the primary axis (x-x) relative to the second rotary connection element.

The rotary interface may comprise a gap between the first and second rotary connection elements. The first rotary connection element may comprise optical fiber (54, 152B) coupled to the fourth collimating lens (24, 122) and orientated coincident with the second rotational axis (30, 132), the first rotary connection element may comprise optical fiber (53, 152A) coupled to the third collimating lens (23, 121) and orientated coincident with the first rotational axis (31, 131), the second rotary connection element may comprise optical fiber (51, 151A) coupled to the first collimating lens (21, 124) and orientated parallel to or coincident with the first rotational axis (31, 131), and the second rotary connection element may comprise optical fiber (52, 151B)

coupled to the second collimating lens (22, 125) and orientated parallel to the second rotational axis (30, 132).

The first subassembly of the second rotary connection element may comprise a first cylindrical member (33, 134A) having an outer bearing surface (43, 142A) orientated about the first rotational axis (31, 131); the second subassembly of the second rotary connection element may comprise a second cylindrical member (34, 134B) having an outer bearing surface (44, 142B) orientated about the second rotational axis (30, 132); and the second rotary connection element may comprise a third subassembly comprising a driven cylindrical member (32, 130) having an outer bearing surface (42, 142D) orientated about the primary axis (x-x). The second rotary connection element may comprise an axially extending linkage (56, 156) connecting the first cylindrical member, the second cylindrical member and the driven cylindrical member such that the first cylindrical member, the second cylindrical member and the driven cylindrical member rotate together relative to the first rotary connection element. The second cylindrical member may comprise a center window (28, 168) orientated perpendicular to the second rotational axis, a first reflector (25, 166B), and a second reflector (26, 165B) supported by the window; wherein the first optical path (P1, P10) extends from the first collimating lens through the center window to the third collimating lens; and wherein the second optical path (P2, P20) extends from the second collimating lens to the first reflector, from the first reflector to the second reflector, and from the second reflector to the fourth collimating lens.

The transmission of an optical signal in the first optical path across the rotary interface may have a first wavelength and the transmission of an optical signal in the second optical path across the rotary interface may have a second wavelength different from or the same as the first wavelength. The transmission of an optical signal in the first optical path across the rotary interface between the first rotary connection element and the second rotary connection element and the transmission of an optical signal in the second optical path across the rotary interface between the first rotary connection element and the second rotary connection element may be simultaneous and/or may each be bi-directional.

The second rotation axis (30) may coincident with the primary axis (x-x). The second rotation axis may diverge from the first rotation axis by an angle (38) that is less than about forty-five degrees. The second rotation axis may diverge from the first rotational axis by an angle (38) that is between about one degree and about thirty degrees. The first collimating lens (21) may be orientated coincident with the first rotational axis (31) and the third collimating lens (23) may be orientated coincident with the first rotational axis, whereby an optical signal may be transmitted across the rotary interface directly between the first rotary connection element and the second rotary connection element in the first optical path.

The first rotation axis (134A) may not be parallel to or coincident with the primary rotational axis (x-x) and the second rotation axis (134B) may not be parallel to or coincident with the primary rotational axis (x-x).

The second rotary connection element may comprise a third subassembly (134C) configured to rotate about a third rotation axis (133) that is not parallel to either the first rotational axis (131) or the second rotational axis (132) with rotation of the second rotary connection element about the primary axis (x-x) relative to the first rotary connection element; the second rotary connection element may comprise a fifth collimating lens (126); the first rotary connection element may comprise a sixth collimating lens (123); the fifth and the sixth collimating lenses may be configured to direct an optical signal between each other in a third optical path (P30) across the rotary interface; one of the fifth collimating lens and the sixth collimating lens (123) may be orientated coincident with the third rotational axis and the other of the fifth collimating lens and the sixth collimating lens (126) may be orientated parallel to or coincident with the third rotational axis; whereby an optical signal may be transmitted across the rotary interface between the first rotary connection element and the second rotary connection element in the third optical path (P30). The first subassembly of the second rotary connection element may comprise a first cylindrical member (134A) having an outer bearing surface (142A) orientated about the first rotational axis (131); the second subassembly of the second rotary connection element may comprise a second cylindrical member (134B) having an outer bearing surface (142B) orientated about the second rotational axis (132); the second subassembly of the second rotary connection element may comprise a third cylindrical member (134C) having an outer bearing surface (142C) orientated about the third rotational axis (133); and the second rotary connection element may comprise a driven subassembly comprising a driven cylindrical member (130) having an outer bearing surface (142D) orientated about the primary axis (x-x). The second rotary connection element may comprise an axially extending linkage (156) connecting the first cylindrical member, the second cylindrical member, the third cylindrical member and the driven cylindrical member such that the first cylindrical member, the second cylindrical member, the second cylindrical member and the driven cylindrical member rotate together relative to the first rotary connection element.

The first cylindrical member may comprise a first center window (167) orientated perpendicular to the first rotational axis, a first reflector (166A), and a second reflector (165A) supported by the first window, and the first optical path (P10) may extend from the first collimating lens to the first reflector, from the first reflector to the second reflector, and from the second reflector to the third collimating lens; the second cylindrical member may comprise a second center window (168) orientated perpendicular to the second rotational axis (132), a third reflector (166B), and a fourth reflector (165B) supported by the second window, and the second optical path (P20) may extend from the second collimating lens to the third reflector, from the third reflector to the fourth reflector, and from the fourth reflector to the fourth collimating lens; and the third cylindrical member may comprise a third center window (169) orientated perpendicular to the third rotational axis (133), a fifth reflector (166C), and a sixth reflector (165C) supported by the third window, and the third optical path (P30) may extend from the fifth collimating lens to the fifth reflector, from the fifth reflector to the sixth reflector, and from the sixth reflector to the sixth collimating lens. The first optical path may extend from the first collimating lens through the second center window and the third center window to the third collimating lens; and the second optical path may extend from the second collimating lens through the third center window to the fourth collimating lens.

In another aspect, a non-contacting rotary connection (15) for transmission of optical signals across an interface defined by two relatively-movable members is provided comprising: a first rotary connection element (18); a second rotary connection element (19) configured to rotate relative to the first rotary connection element; the second rotary connection element having a first subassembly (34) configured to rotate about a first rotational axis (30) with rotation of the second rotary connection element relative to the first rotary connection element; the second rotary connection element having a second subassembly (33) configured to rotate about a second rotation axis (31) that is not parallel to the first rotational axis with rotation of the second rotary connection element relative to the first rotary connection element; a rotary interface (20) between the first rotary connection element and the second rotary connection element; the second rotary connection element comprising a first collimating lens (21) and a second collimating lens (22); the first rotary connection element comprising a third collimating lens (23) and a fourth collimating lens (24); the first and the third collimating lenses configured to direct an optical signal between each other in a first optical path (P1) across the rotary interface; the second and the fourth collimating lenses configured to direct an optical signal between each other in a second optical path (P2) across the rotary interface; one of the second collimating lens and the fourth collimating lens (24) orientated coincident with the first rotational axis (30) and the other of the second collimating lens and the fourth collimating lens (22) orientated parallel to the first rotational axis (30); one of the first collimating lens and the third collimating lens (21) orientated coincident with the second rotational axis (31) and the other of the first collimating lens and the third collimating lens (23) orientated coincident with the second rotational axis; whereby an optical signal may be transmitted across the rotary interface directly between the first rotary connection element and the second rotary connection element in the first optical path (P1) and an optical signal may be transmitted across the rotary interface between the first rotary connection element and the second rotary connection element in the second optical path (P2).

The first rotary connection element may be stationary relative to a housing (16) and the second rotary connection element may rotate relative to the first rotary connection element. The first rotary connection element may rotate about the first rotational axis and the second rotary connection element may rotate about the first rotational axis at a speed different from the first rotary connection element. The second rotary connection element may be stationary relative to a housing and the first rotary connection element may rotate relative to the second rotary connection element.

The rotary interface may comprise a gap between the first and second rotary connection elements. The first rotary connection element may comprise optical fiber (54) coupled to the fourth collimating lens (24) and orientated coincident with the first rotational axis (30), the first rotary connection element may comprise optical fiber (53) coupled to the third collimating lens (23) and orientated coincident with the second rotational axis (31), the second rotary connection element may comprise optical fiber (51) coupled to the first collimating lens (21) and orientated coincident with the second rotational axis (31), and the second rotary connection element may comprise optical fiber (52) coupled to the second collimating lens (22) and orientated parallel to the first rotational axis (30).

The first subassembly of the second rotary connection element may comprise a first cylindrical member (34) having an outer bearing surface (44) orientated about the first rotational axis (30); the second subassembly of the second rotary connection element may comprise a second cylindrical member (33) having an outer bearing surface (43) orientated about the second rotational axis (31); and the second rotary connection element may comprise a third subassembly comprising a driven cylindrical member (32) having an outer bearing surface (42) orientated about the first rotational axis (30). The second rotary connection element may comprise an axially extending linkage (56) connecting the first cylindrical member, the second cylindrical member and the driven cylindrical member such that the first cylindrical member, the second cylindrical member and the driven cylindrical member rotate together relative to the first rotary connection element. The first cylindrical member may comprise a center window (28) orientated perpendicular to the first rotational axis, a first reflector (25), and a second reflector (26) supported by the window; wherein the first optical path extends from the first collimating lens through the center window to the third collimating lens; and wherein the second optical path extends from the second collimating lens to the first reflector, from the first reflector to the second reflector, and from the second reflector to the fourth collimating lens.

The transmission of an optical signal in the first optical path across the rotary interface may have a first wavelength and the transmission of an optical signal in the second optical path across the rotary interface may have a second wavelength different from or the same as the first wavelength. The transmission of an optical signal in the first optical path across the rotary interface between the first rotary connection element and the second rotary connection element and the transmission of an optical signal in the second optical path across the rotary interface between the first rotary connection element and the second rotary connection element may be simultaneous and/or bi-directional. The second rotation axis may diverge from the first rotational axis by an angle (38) that is less than about forty-five degrees. The second rotation axis may diverge from the first rotational axis by an angle (38) that is between about one degree and about thirty degrees.

DETAILED DESCRIPTION OF THE EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
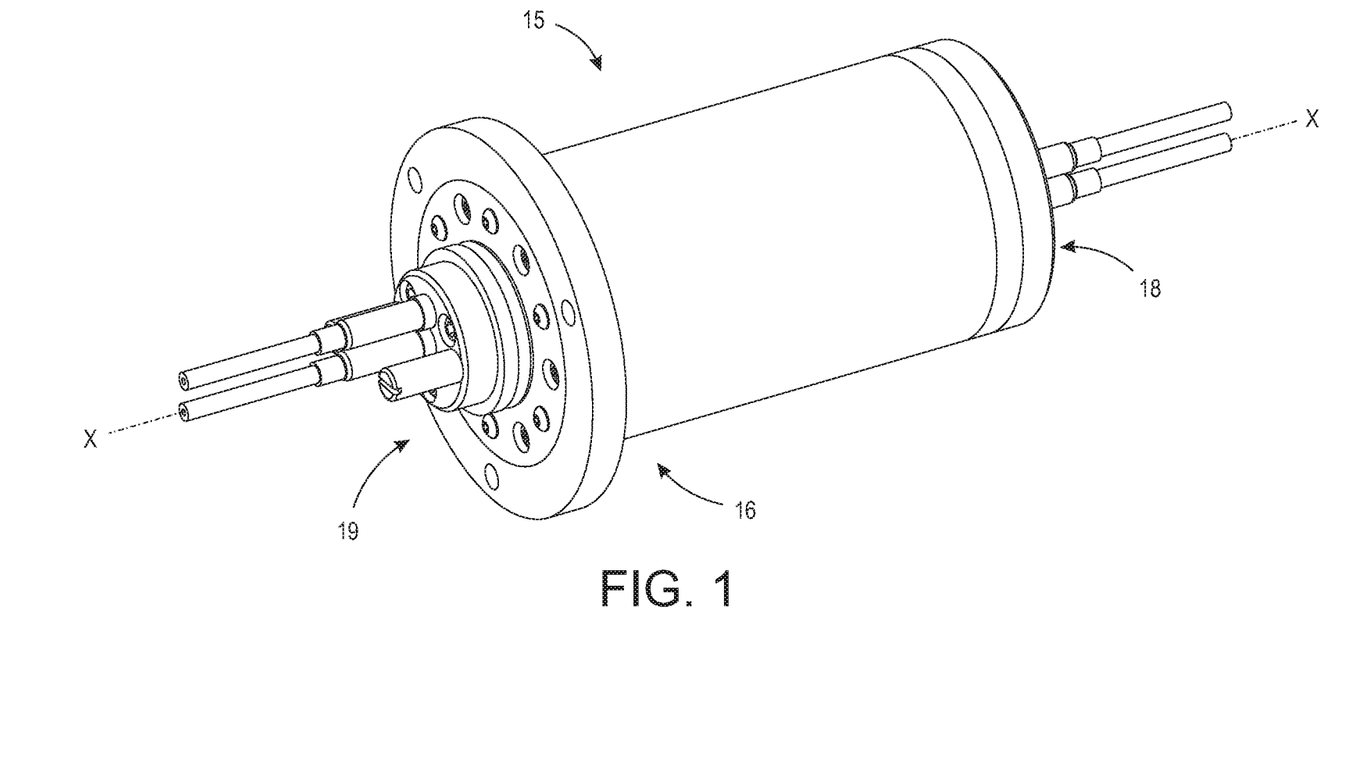
FIG. 1 is an isometric view of a first embodiment of an improved fiber optic rotary connection.
Figure 2:
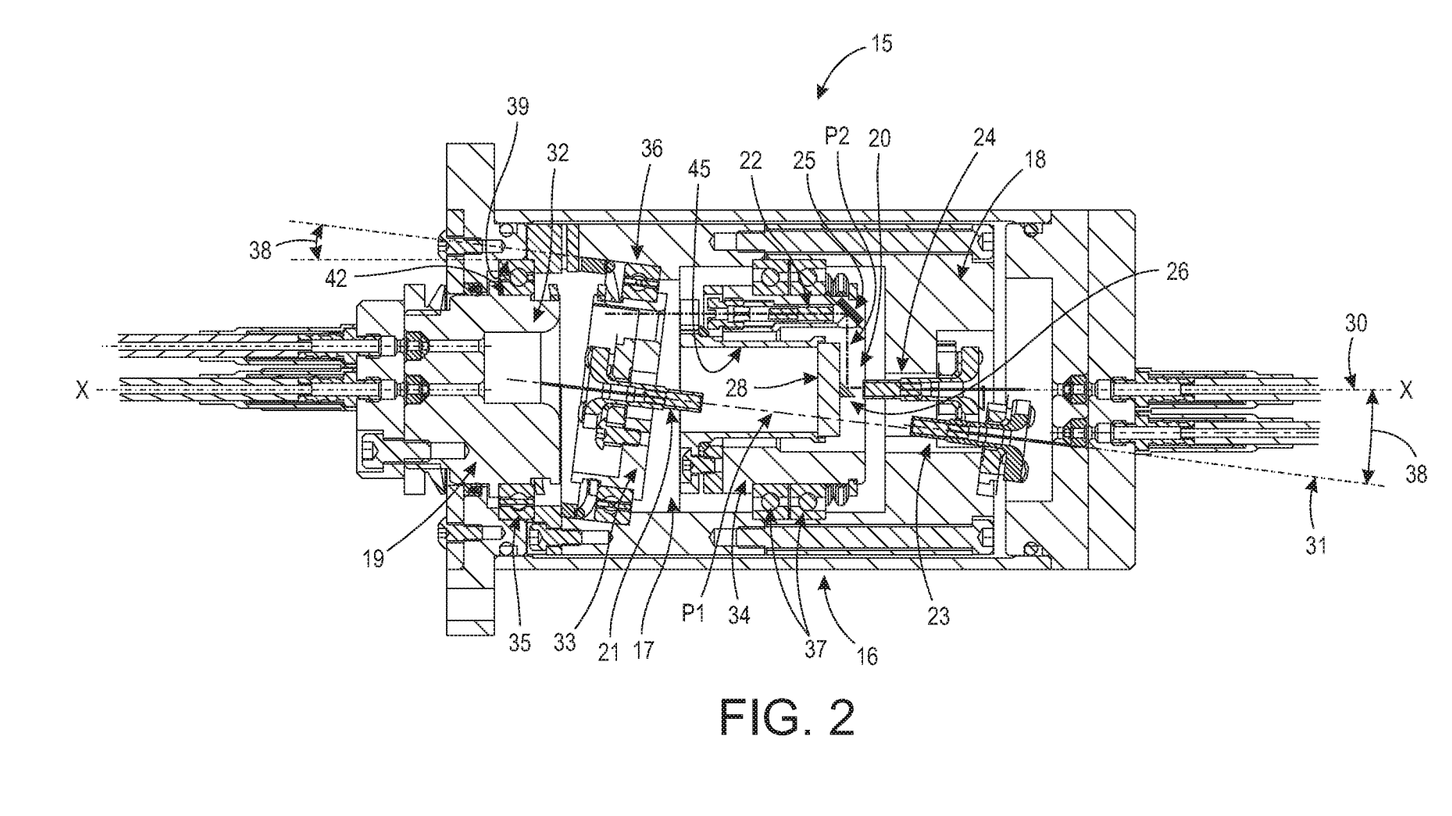
FIG. 2 is a longitudinal sectional view of the fiber optic rotary connection shown in FIG. 1, taken generally on a plane passing through central axis x-x.
Figure 3:
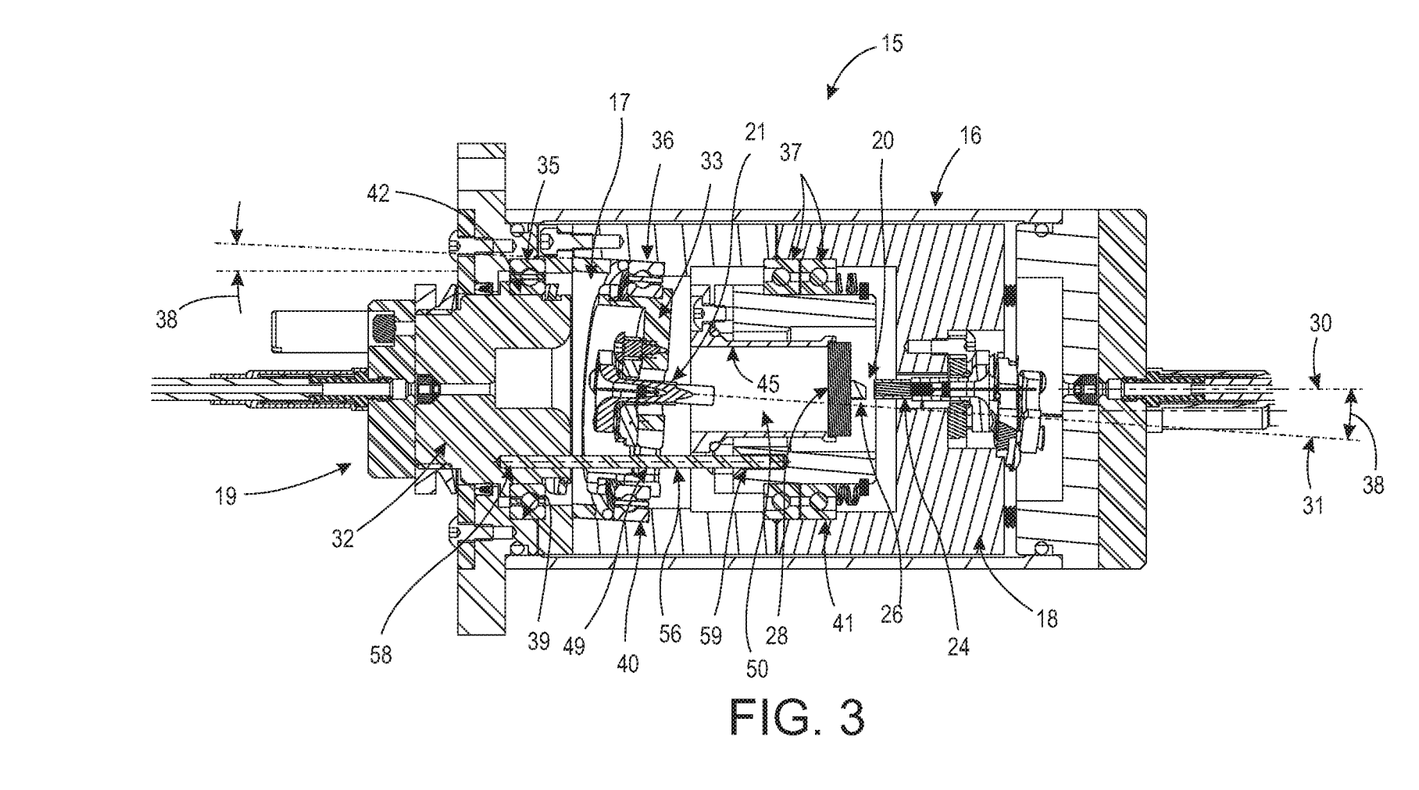
FIG. 3 is a longitudinal sectional view of the fiber optic rotary connection shown in FIG. 1, taken generally on a plane passing through central axis x-x at an angle offset from the sectional view shown in FIG. 2.

Referring now to the drawings, and more particularly to FIGS. 1-3 thereof, an improved optical rotary connection is provided, of which a first embodiment is generally indicated at 15. In this embodiment, a two-pass rotary connection is provided. Fiber optic rotary joint 15 is shown as broadly including housing 16, which in this embodiment generally supports stationary connection element 18 and rotating connection element 19. As shown, housing 16 is configured to provide a rotary joint between connection elements 18 and 19 that permits at least one of connection elements 18 or 19 to rotate relative to the other. As shown, housing 16 is a generally cylindrical member having an elongated inner cylindrical cavity 17 housing rotational elements 19. While in this embodiment element 18 is generally held stationary and element 19 is generally permitted to rotate about its longitudinal axis x-x, alternatively both elements 18 and 19 could be configured to rotate about axis x-x at different speeds and/or in different directions. As another alternative and as further described below, connection element 19 may be configured to be held stationary while element 18 is generally permitted to rotate about its longitudinal axis x-x. Thus, one or both of connection elements 18 and 19 are rotatably mounted such that one element may rotate about its respective longitudinal axis relative to the other element. Thus, while in this embodiment connection 15 is described as having a rotary side or rotor 19 and a stationary side, stator or body 18, the two elements are interchangeable and either side can act as the other.

Connection elements 18 and 19 are generally positioned on opposite sides of rotary interface or joint 20 and include specially positioned and orientated collimators 21, 22, 23 and 24 and light waveguides 51, 52, 53 and 54 configured to transmit optical signals across rotary interface 20. Connection elements 18 and 19 provide a multi-pass optical joint having at least two paths, P1 and P2, with path P1 being off-axis and direct. In at least off-axis path P1 the light travels between opposed wave guides across interface 20 without deflection and without intermediate optical reflectors. Thus, a bi-directional two channel or two pass fiber optic rotary joint is provided, with a pass being a fiber optic connection involving a pair of optical collimators where the optical signal is passed from one optical collimator to the other. Both channels P1 and P2 are also bidirectional, such that each can carry signals in either direction. In the present embodiment, both passes use standard GRIN lenses as the collimators. A GRIN lens or gradient index lens is coupled with optical fiber to produce a collimated beam. However, other beam directing lenses or devices may be used as alternatives.

Figure 4:
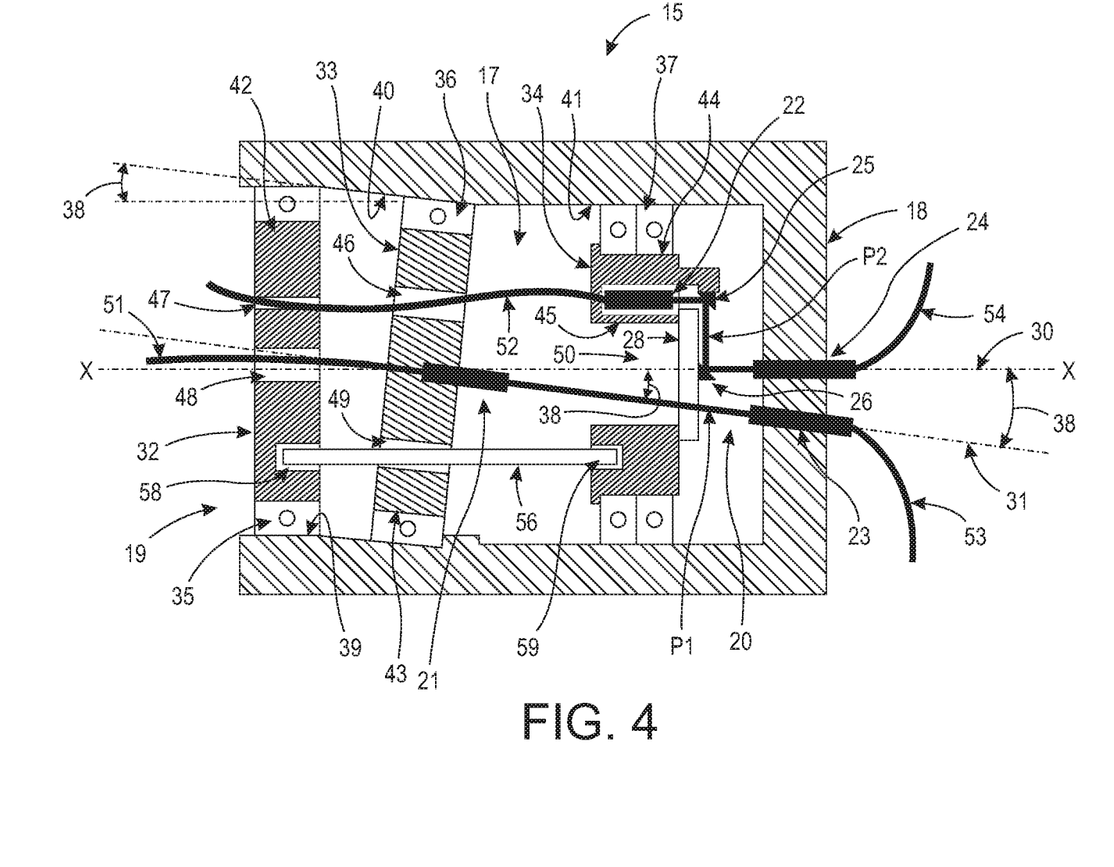
FIG. 4 is a schematic longitudinal sectional view of fiber optic rotary connection shown in FIG. 1, showing optical elements and linkages in the same sectional plane.

As shown in FIGS. 2-4, second optical pass channel P2 is arranged such that on-axis collimator 24 on stationary side 18 is aligned with off-axis collimator 22 on rotational side 19. In the present embodiment, pass P2 uses two standard GRIN lenses 22 and 24, and two reflectors 25 and 26 with one reflector 26 mounted on window 28 to direct the beam and align the two opposed collimators 22 and 24 across rotary interface 20.

First optical pass P1 is direct and without reflectors. For first optical pass channel P1, off-axis collimator 23 on stationary side 18 is aligned with collimator 21 on rotation side 19 that is tilted off of first rotation axis 30 to align with second rotation axis 31. In the present embodiment, channel P1 uses two standard GRIN lenses 21 and 23, where one of the lenses or collimators sits in the center of disk 33 which sits in annular bearing 36 that is tilted at angle 38 off of axis of rotation 30 on rotor side 19. The mating collimator 23 for first pass P1 sits off-axis next to second pass P2 collimator 24 in stator 18, and is tilted to align with collimator 21 on first pass disk 33. The collimated beam of first pass P1 is directed through second pass window 28 directly to mating collimator 23 in stator 18. Thus, the mechanical arrangement of the two collimators allows them to track and maintain alignment during rotation and to provide a direct path for optical transmission. By using this tilt mechanism, the two collimators 21 and 23 are kept in dire ct alignment over 360 degrees of rotation without interfering with second pass P2 and without the need for intermediate reflectors or the like.

Referring to FIG. 4, two-pass optical rotary joint 15 is illustrated schematically in longitudinal cross section. As shown, rotary joint 15 comprises stationary body 18 and rotor 19 that comprises three rotation elements, namely primary rotator disk 32, tilted first pass disk 33, and window holding second pass disk 34. Input wave guides 51 and 52 are illustrated entering the rotation side 19 of optical rotary joint 15 and output wave guides 53 and 54 are illustrated leaving the stationary side 18.

Body 18 contains two optical collimators 23 and 24 mounted on one end with collimator 23 positioned on stator 18 off of axis of rotation 30 and angled 38 to align with rotation axis 31 such that it is optically aligned with collimator 21 positioned on rotation side 19. Light is launched from collimators 21 and 22 to collimators 23 and 24, respectively, or launched from collimators 23 and 24 to collimators 21 and 22, respectively. So there are two bi-directional optical passes P1 and P2.

Indirect pass P2 comprises optical collimators 22 and 24 with optical fiber optically aligned and attached by epoxy or other means to each GRIN lens. Collimator 24 is positioned on the axis of rotation 30 and is aligned with collimator 22 using a first reflector 25 and a second reflector 26, which is mounted on window 28 of disk 34.

Direct pass P1 comprises the optical alignment of GRIN collimator 21 and GRIN collimator 23, with optical fiber optically aligned and attached by epoxy or other means to each GRIN lens.

Optical rotor connection element 19 general comprises primary rotator disk 32, tilted first pass disk 33, and second pass disk 34. Primary rotator disk 32, tilted first pass disk 33, and second pass disk 34 all rotate together, via linkage pin 56, relative to stationary element 18.

A set of annular bearings 37 between inner cylindrical surface 41 of housing 16 and outer cylindrical surface 44 of second pass disk 34 rotationally support second pass disk 34 such that second pass disk 34 rotates about first rotational axis 30 when primary rotator disk 32 rotates relative to housing 16 and stator 18. As shown, inner cylindrical surface 41 of housing 16 and outer cylindrical surface 44 of second pass disk 34 are both orientated about rotational axis 30. As shown, second pass disk 34 is a generally cylindrical ring-like member defined by outer cylindrical surface 44 and an inner cylindrical surface 45, both orientated about rotational axis 30. Inner cylindrical surface 45 defines central annular opening or through-bore 50 in second pass disk 34 orientated about rotational axis 30.

Second pass disk 34 supports window 28, which in turn supports reflector 26. As shown, window 28 extends across the right end of central opening 50 in second pass disk 34. Reflector 26 is oriented centrally on axis 30 and on the surface of window 28 and aligned with reflector 25, which is supported outside of opening 50 and window 28 on disk 34. Reflector 25 is optically aligned parallel to rotational axis 30 with collimator 22 and perpendicular to rotational axis 30 with reflector 26. Collimator 24 is optically aligned on rotational axis 30 with reflector 26. Opening 50 and window 28 allow the direct optical path P1 from collimator 21 to pass through and interface with collimator 23 while holding reflector 26 in position with collimator 24 and reflector 25 and hence maintains alignment between collimator 22 and collimator 24. Disk 34 includes mounting recess 59, which receives one end of drive pin 56.

Annular bearing 36 between inner cylindrical surface 40 of housing 16 and outer cylindrical surface 43 of first pass disk 33 rotationally supports first pass disk 33 such that first pass disk 33 rotates about second rotational axis 31 when primary rotator disk 32 rotates about first rotation axis 30 relative to housing 16 and stator 18. As shown, inner cylindrical surface 40 of housing 16 and outer cylindrical surface 43 of second pass disk 34 are both orientated about second rotational axis 31. Primary pass disk 33 supports collimator 21, which is located centrally on disk 33 and aligned along rotation axis 31. As shown, bearing 36 sits in angled cylindrical bore 40 of housing 16. Bore 40 is angled 38 from inner surface 41 of housing 16 orientated parallel to axis 30 such that collimator 21 is aligned with collimator 23 and optical path P1 between collimator 23 and collimator 21 passes through opening 50 and window 28 but is not obstructed by reflector 26 or second pass disk 34. Tilted axis of rotation 31 of disk 33 is such that it is off axis to axis of rotation 30 at angle 38. Without limitation, angle 38 may be between about one-half a degree and forty-five degrees, and may preferably be between about one degree and about thirty degrees, depending on the unit dimensions desired. Wave guide 52, which is attached to collimator 22, passes through opening or through-bore 46 located off center in disk 33.

Annular bearing 35 between inner cylindrical surface 39 of housing 16 and outer cylindrical surface 42 of primary rotator disk 32 rotationally supports primary rotator disk 32 such that primary rotator disk 32 rotates about rotational axis 30 relative to housing 16 and stator 18. As shown, inner cylindrical surface 39 of housing 16 and outer cylindrical surface 42 of primary rotator disk 32 are both orientated about rotational axis 30. Bearing 35 is located centrally in housing 16 and is orientated about axis of rotation 30. Primary rotator disk 32 includes mounting recess 58, which receives one end of drive pin 56. Wave guide 52, which is attached to collimator 22, passes through opening or through-bore 47 located off center in rotator disk 32. Wave guide 51, which is attached to collimator 21, passes through opening or through-bore 48 located centrally in rotator disk 32.

Drive pin 56 transmits the rotational movement of primary rotator disk 32 to disk 33 and disk 34 such that primary rotator disk 32, disk 33 and disk 34 are rotationally coupled. One end of drive pin 56 sits in recess 58 of rotator 32. Drive pin 56 extends through opening 49 in first pass disk 33 and the other end of drive pin 56 sits in recess 59 of second pass disk 34. When rotator 32 is rotated via torque pins, it in turn rotates drive pin 56 about rotational axis 30, which contacts first pass disk 33 at through-bore 49 and second pass disk 34 in recess 59 and thereby drives both first pass disk 33 and second pass disk 34 in the same direction and at the same speed as rotator 32 relative to housing 16 and body 18. When body 18 is rotated and rotator 32 is held fixed, drive pin 56 keeps first pass disk 33 and second pass disk 34 from rotating.

As rotator 32 is rotated, drive pin 56 drives first pass disk 33 and first pass disk 33 rotates about its own secondary rotational axis 31 and remains tilted by angle 38 in the same orientation over its full rotation due to angled bore 40 in housing 16. Collimator 21 and first optical path P1 rotates about secondary rotational axis 31 but remains tilted at angle 38 toward collimator 23 and hence maintains alignment with collimator 23 over the full 360 degree angular rotation of rotator 32 about central rotational axis 30.

On the other hand, body 18 may be rotated and rotator 32 may be held fixed. In this operation, as 18 rotates, angle 38 of disk bore 40 keeps bearing 36 and first pass disk 33 at the correct angle 38 to maintain alignment between collimator 21 located in first pass disk 33 and collimator 23 located in body 18. Drive pin 56 stops first pass disk 33 from rotating about its own rotational axis 31 and, accordingly, rotational axis 31 processes about rotation axis 30 and its optical path P1 traces a circle which collimator 23 tracks as body 18 rotates. Accordingly, a direct optical path P1 is also provided in this alternative rotational configuration.

Thus, the second of the two fiber optic signals P2 is directed between collimator 24 coincident to externally accessible rotation axis 30 on one side 18 of rotary interface 20 to collimator 22 parallel to rotation axis 30 on the other side 19 of rotary interface 20, the optical coupling being achieved with the use of two mirrors 25 and 26 to direct the collimated beam of light from on-axis 30 to parallel to axis 30. The first of the two fiber optic signals P1 is directed from collimator 21 tilted from rotation axis 30 of the second fiber optic signal P2 but coincident to second internal rotation axis 31 on one side 19 of rotary interface 20 to collimator 23 coincident to second rotation axis 31 on the other side 18 of rotary interface 20 through opening 50 and window 28, which supports mirror 26 used for second fiber optic signal P2. The mechanical construction of fiber optic rotary joint 15 permits signals to be sent in either direction on either optical path P1 and P2 without significant losses due to obscurations of one beam by the mechanical structure supporting the optics of the other.

During rotation of side 18 of rotary interface 20 about externally accessible rotation axis x-x with the side 19 of rotary interface held stationary, collimator 24 of the second fiber optic signal P2 on side 18 of rotary interface 20 rotates about axis 30 coincident to external rotation axis x-x at all rotation angles while collimator 22 of second fiber optic signal P2 on side 19 of rotary interface 20 remains stationary and parallel to external rotation axis 30 and maintains optical alignment over all rotation angles about rotation axis 30, and collimator 23 of first fiber optic signal P1 on side 18 of rotary interface 20 rotates coincident to second internal rotational axis 31 and processes about externally accessible rotation axis 30 while collimator 21 of first fiber optic signal P1 on side 19 of rotary interface 20 remains stationary to and coincident with second internal rotational axis 31, which also processes about externally accessible rotation axis 30 and maintains optical alignment over all rotation angles. Conversely, during rotation of side 19 of rotary interface 20 about externally accessible rotation axis 30 with side 18 of rotary interface 20 held stationary, collimator 22 of second fiber optic signal P2 on side 19 of rotary interface 20 revolves about externally accessible rotation axis 30 while collimator 24 of second fiber optic signal P2 on side 18 of rotary interface 20 remains stationary and coincident to externally accessible rotation axis 30 and maintains optical alignment over all rotation angles, and collimator 21 of first fiber optic signal P1 on side 19 of rotary interface 20 is coincident with and rotates about internal rotation axis 31 at all rotation angles while collimator 23 of first fiber optic signal P1 on side 18 of rotary interface 20 remains coincident with and stationary to internal rotation axis 31 and maintains optical alignment over all rotation angles. Thus, when side 19 rotates relative to side 18, collimators 21 and 22 rotate about different non-parallel axes, and fiber optic rotary joint 15 allows for full bidirectional transmission on both optical paths inside the rotary joint.

Fiber optic rotary joint 15 provides a non-geared, compact 2-channel fiber optic rotary non-contact connection. It is a passive and bidirectional device which can be used as a standalone device or easily integrated into a rotary assembly, enabling transfer of high date rate optical signals across a rotating interface. While a two-channel embodiment has been shown and described, a fiber optic rotary connection having more than two channels may be employed as an alternative.

Figure 5:
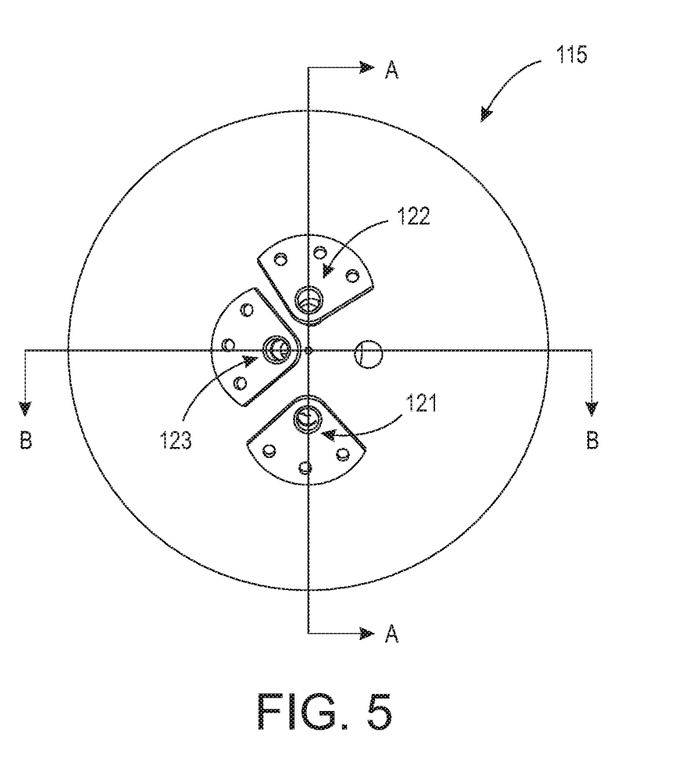
FIG. 5 is an end view of a second embodiment of an improved fiber optic rotary connection.
Figure 6:
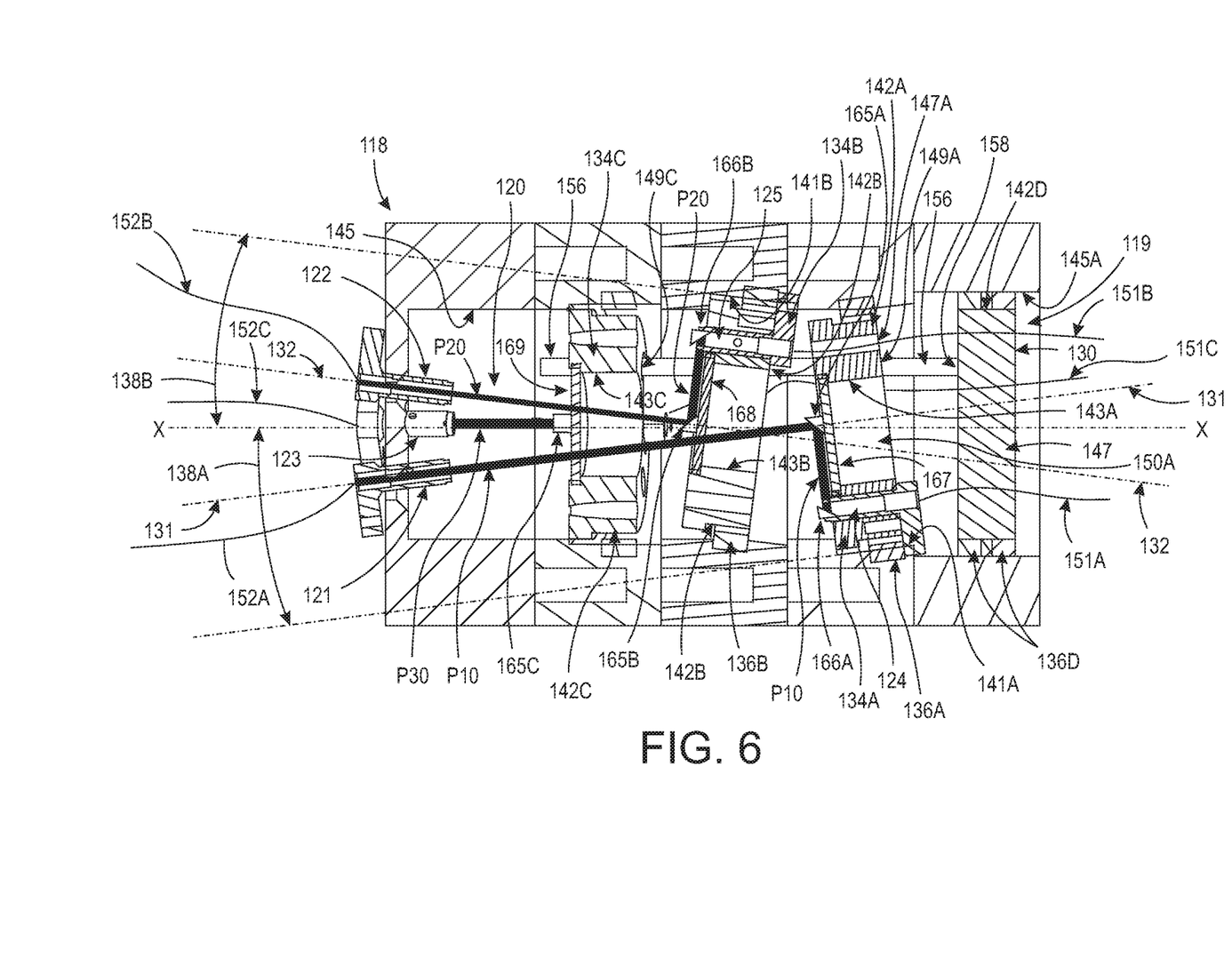
FIG. 6 is a vertical longitudinal sectional view of the fiber optic rotary connection shown in FIG. 5, taken generally on line A-A of FIG. 5.
Figure 7:
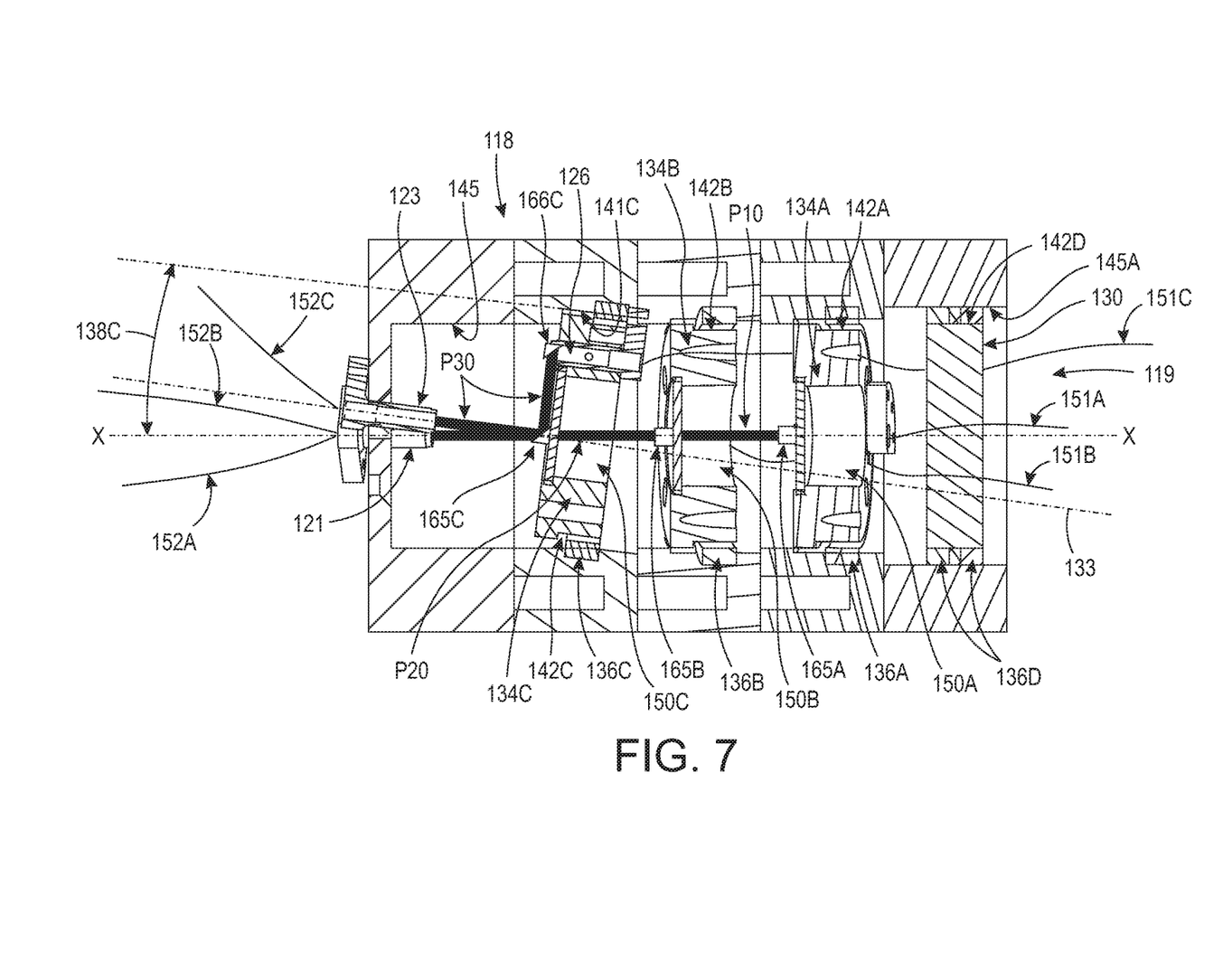
FIG. 7 is a horizontal longitudinal sectional view of the fiber optic rotary connection shown in FIG. 5, taken generally on line B-B of FIG. 5.

Referring now to FIGS. 5-7, a second embodiment 115 of an optical rotary connection is provided. This embodiment is similar to optical rotary connection 15, but instead of a two-pass connection, embodiment 115 provides a three-pass connection. Fiber optic rotary joint 115 includes a housing that supports stationary connection element 118 and rotating connection element 119 and is configured to provide a rotary joint between connection elements 118 and 119 that permits at least one of connection elements 118 or 119 to rotate relative to the other. While in this embodiment element 118 is generally held stationary and element 119 is generally permitted to rotate about its longitudinal axis x-x, alternatively both elements 118 and 119 could be configured to rotate about axis x-x at different speeds and/or in different directions. As another alternative and as further described below, connection element 119 may be configured to be held stationary while element 118 is generally permitted to rotate about its longitudinal axis x-x. Thus, one or both of connection elements 118 and 119 are rotatably mounted such that one element may rotate about its respective longitudinal axis relative to the other element. Thus, while in this embodiment connection 115 is described as having a rotary side or rotor 119 and a stationary side, stator or body 118, the two elements are interchangeable and either side can act as the other.

Connection elements 118 and 119 are generally positioned on opposite sides of rotary interface 120 and include specially positioned and orientated rotary tilted discs 134A, 134B and 134C, collimators 121, 122, 123, 124, 125 and 126 supported by disks 134A, 134B and 134C, respectively, and light waveguides 151A, 151B, 151C, 152A, 152B and 152C configured to transmit optical signals to and from collimators 121, 122, 123, 124, 125 and 126, respectively. Connection elements 118 and 119 provide a multi-pass optical joint having at least three paths, P10, P20 and P30, with paths P10, P20 and P30 all being transverse to longitudinal axis x-x and indirect.

As shown in FIG. 6, pass P10 uses two standard GRIN lenses 121 and 124, and two reflectors 165A and 166A, with one reflector 165A mounted on window 167, to direct the beam between the two opposed collimators 121 and 124 across rotary interface 120. First optical pass channel P10 is arranged such that collimator 121 is orientated coincident with rotational axis 131 of disk 134A on stationary side 118. Collimator 121 on stationary side 118 is paired with collimator 124 on rotational side 119. Collimator 124 is mounted on disk 134A on rotation side 119. Disk 134A is tilted off of longitudinal axis x-x such that disk 134A rotates about and aligns with rotation axis 131. Thus, collimator 124 sits in disk 134A, which in turn is supported in annular bearing 136A that is tilted at angle 138A off of longitudinal axis of rotation x-x on rotor side 119. The mating collimator 121 for first pass P10 sits in stator 118 and is tilted to align on rotational axis 131. The collimated beam of first pass P10 is directed in one direction from collimator 121 on stator 118 across rotary interface 120, through both third pass window 169 and second pass window 168, from reflector 165A mounted on window 167 to reflector 166A, and to mating collimator 124 in disk 134A of rotor 119. The collimated beam of first pass P10 is directed in the other direction from collimator 124 in disk 134A of rotor 119, from reflector 166A to reflector 165A mounted on window 167, through both second pass window 168 and third pass window 169, and across rotary interface 120 to mating collimator 121 in stator 118. Thus, the mechanical arrangement of the two collimators allows them to track and maintain alignment during rotation and to provide a path for optical transmission. By using this tilt mechanism, the two collimators 121 and 124 are kept in alignment over 360 degrees of rotation without interfering with second pass P20 or third pass P30 and without the need for additional intermediate reflectors or the like.

As shown in FIG. 6, pass P20 uses two standard GRIN lenses 122 and 125, and two reflectors 165B and 166B, with one reflector 165B mounted on window 168, to direct the beam between the two opposed collimators 122 and 125 across rotary interface 120. Second optical pass channel P20 is arranged such that collimator 122 is orientated coincident with rotational axis 132 of disk 134B on stationary side 118. Collimator 122 on stationary side 118 is paired with collimator 125 on rotational side 119. Collimator 125 is mounted on disk 134B on rotation side 119. Disk 134B is tilted off of longitudinal axis x-x such that disk 134B rotates about and aligns with rotation axis 132. Thus, collimator 125 sits in disk 134B, which in turn is supported in annular bearing 136B that is tilted at angle 138B off of longitudinal axis of rotation x-x on rotor side 119. The mating collimator 122 for second pass P20 sits in stator 118 and is tilted to align on rotational axis 132. The collimated beam of second pass P20 is directed in one direction from collimator 122 on stator 118 across rotary interface 120, through third pass window 169, from reflector 165B mounted on window 168 to reflector 166B, and to mating collimator 125 in disk 134B of rotor 119. The collimated beam of second pass P20 is directed in the other direction from collimator 125 in disk 134B of rotor 119, from reflector 166B to reflector 165B mounted on window 168, through third pass window 169, and across rotary interface 120 to mating collimator 122 in stator 118. Thus, the mechanical arrangement of the two collimators allows them to track and maintain alignment during rotation and to provide a path for optical transmission. By using this tilt mechanism, the two collimators 122 and 125 are kept in alignment over 360 degrees of rotation without interfering with first pass P10 or third pass P30 and without the need for additional intermediate reflectors or the like.

As shown in FIG. 7, pass P30 uses two standard GRIN lenses 123 and 126, and two reflectors 165C and 166C, with one reflector 165C mounted on window 169, to direct the beam between the two opposed collimators 123 and 126 across rotary interface 120. Third optical pass channel P30 is arranged such that collimator 123 is orientated coincident with rotational axis 133 of disk 133 on stationary side 118. Collimator 123 on stationary side 118 is paired with collimator 126 on rotational side 119. Collimator 126 is mounted on disk 134C on rotation side 119. Disk 134C is tilted off of longitudinal axis x-x such that disk 134C rotates about and aligns with rotation axis 133. Thus, collimator 126 sits in disk 134C, which in turn is supported in annular bearing 136C that is tilted at angle 138C off of longitudinal axis of rotation x-x on rotor side 119. The mating collimator 123 for third pass P30 sits in stator 118 and is tilted to align on rotational axis 133. The collimated beam of third pass P30 is directed in one direction from collimator 123 on stator 118 across rotary interface 120, from reflector 165C mounted on window 169 to reflector 166C, and to mating collimator 126 in disk 134C of rotor 119. The collimated beam of third pass P30 is directed in the other direction from collimator 126 in disk 134C of rotor 119, from reflector 166C to reflector 165C mounted on window 169, and across rotary interface 120 to mating collimator 123 in stator 118. Thus, the mechanical arrangement of the two collimators allows them to track and maintain alignment during rotation and to provide a path for optical transmission. By using this tilt mechanism, the two collimators 123 and 126 are kept in alignment over 360 degrees of rotation without interfering with second pass P20 or third pass P30 and without the need for additional intermediate reflectors or the like.

Thus, a bi-directional three channel or three pass fiber optic rotary joint is provided. In the present embodiment, all three passes use standard GRIN lenses as the collimators. A GRIN lens or gradient index lens is coupled with optical fiber to produce a collimated beam. However, other beam directing lenses or devices may be used as alternatives in one or more of the channels.

Accordingly, three-pass optical rotary joint 115 is illustrated in longitudinal cross section in FIGS. 6 and 7. As shown, rotor 119 comprises four rotation elements, namely primary rotator disk 130, tilted window holding first pass disk 134A, tilted window holding second pass disk 134B, and tilted window holding third pass disk 134C. Wave guides 151A, 151B and 151C are illustrated entering the rotation side 119 of optical rotary joint 115 and wave guides 152A, 152B and 152C are illustrated entering the stationary side 118.

Body 118 contains three optical collimators 121, 122 and 123 mounted on one end and being aligned on axes 131, 132 and 133, respectively. None of axis 131, 132 and 133 are parallel or coincident to central longitudinal axis x-x. Rotor side 119 contains three optical collimators 124, 125 and 126 mounted on tilted disks 134A, 134B and 134C that rotate about axes 131, 132 and 133, respectively, relative to stator side 118 with rotation of primary rotator disk 130 about axis x-x. Light is launched and directed from collimators 121, 122 and 123 to collimators 124, 125 and 126, respectively, or launched from collimators 124, 125 and 126 to collimators 121, 122 and 123, respectively. This provides three bi-directional optical passes P10, P20 and P30.

Indirect pass P10 comprises optical collimators 121 and 124 with optical fiber 152A and 151A, respectively, optically aligned and attached by epoxy or other means to each GRIN lens. Collimator 121 is positioned on axis of rotation 131 and is aligned with collimator 124 using a first reflector 165A, which is mounted on window 167 of disk 134A, and a second reflector 166A.

Indirect pass P20 comprises optical collimators 122 and 125 with optical fiber 152B and 151B, respectively, optically aligned and attached by epoxy or other means to each GRIN lens. Collimator 122 is positioned on axis of rotation 132 and is aligned with collimator 125 using a first reflector 165B, which is mounted on window 168 of disk 134B, and a second reflector 166B.

Indirect pass P30 comprises optical collimators 123 and 126 with optical fiber 152C and 151C, respectively, optically aligned and attached by epoxy or other means to each GRIN lens. Collimator 123 is positioned on axis of rotation 133 and is aligned with collimator 126 using a first reflector 165C, which is mounted on window 169 of disk 134C, and a second reflector 166C.

Optical rotor connection element 119 general comprises primary rotator disk 130, tilted first pass disk 134A, tilted second pass disk 134B, and tilted third pass disk 134C. Primary rotator disk 130, tilted first pass disk 134A, tilted second pass disk 134B, and tilted third pass disk 134C all rotate together, via linkage pin 156, relative to stationary element 118.

Primary rotator disk 130 is a generally cylindrical ring-like member defined by outer cylindrical surface 142D orientated about longitudinal axis x-x. Annular bearings 136D between inner cylindrical surface 145A of stator 118 and outer cylindrical surface 142D of primary rotator disk 130 rotationally support primary rotator disk 130 such that primary rotator disk 130 rotates about longitudinal axis x-x relative to housing stator 118. As shown, inner cylindrical surface 145A and outer cylindrical surface 142D of primary rotator disk 130 are both orientated about longitudinal axis x-x. Bearings 136D are located centrally in stator 118 and are orientated about longitudinal axis x-x. Primary rotator disk 130 includes mounting recess 158, which receives one end of drive pin 156. Wave guides 151A, 151B and 151C pass through openings in or a through-bore 147 located centrally in rotator disk 130.

Tilted first pass disk 134A is a generally cylindrical ring-like member defined by outer cylindrical surface 142A and inner cylindrical surface 143A, both orientated about rotational axis 131. Inner cylindrical surface 143A defines central annular opening or through-bore 150A in first pass disk 134A orientated about rotational axis 131. Annular bearing 136A between inner cylindrical surface 141A of housing stator 118 and outer cylindrical surface 142A of first pass disk 134A rotationally support first pass disk 134A such that first pass disk 134A rotates about first rotational axis 131 when primary rotator disk 130 rotates about axis x-x relative to stator 118. As shown, inner cylindrical surface 141A of housing 116 and outer cylindrical surface 142A of first pass disk 134A are both orientated about rotational axis 131. As shown, bearing 136A sits in angled cylindrical bore 141A of stator 118. Bore 141A is angled 138A from inner cylindrical surface 145 of stator 118, with surface 145 being orientated concentric to longitudinal axis x-x. Tilted axis of rotation 131 of disk 134A is such that it is off axis to longitudinal axis of rotation x-x at angle 138A. Without limitation, angle 138A may be between about one-half a degree and forty-five degrees, and may preferably be between about one degree and about thirty degrees, depending on the unit dimensions desired. Wave guide 151A, which is attached to collimator 124, passes through an opening in or a through-bore 147 in rotator disk 130.

First pass disk 134A supports window 167, which in turn supports reflector 165A. As shown, window 167 extends across the left end of central opening 150A in first pass disk 134A. Reflector 165A is oriented centrally on axis 131 on the surface of window 167 and aligned with reflector 166A, which is supported outside of opening 150A and window 167 on disk 134A. Reflector 166A is optically aligned parallel to rotational axis 131 with collimator 124 and perpendicular to rotational axis 131 with reflector 165A. Collimator 124 is optically aligned parallel to rotational axis 131 with reflector 166A. Opening 150A and window 167 hold reflector 165A in position with collimator 121 and reflector 166A and hence maintains alignment between collimator 121 and collimator 124. Disk 134A includes opening 149A, through which drive pin 156 extends.

Tilted second pass disk 134B is a generally cylindrical ring-like member defined by outer cylindrical surface 142B and inner cylindrical surface 143B, both orientated about rotational axis 132. Inner cylindrical surface 143B defines central annular opening or through-bore 150B in second pass disk 134B orientated about rotational axis 132. Annular bearing 136B between inner cylindrical surface 141B of housing stator 118 and outer cylindrical surface 142B of second pass disk 134B rotationally support second pass disk 134B such that second pass disk 134B rotates about second rotational axis 132 when primary rotator disk 130 rotates about axis x-x relative to stator 118. As shown, inner cylindrical surface 141B of housing 116 and outer cylindrical surface 142B of second pass disk 134B are both orientated about rotational axis 132. As shown, bearing 136B sits in angled cylindrical bore 141B of stator 118. Bore 141B is angled 138B from inner cylindrical surface 145 of stator 118. Tilted axis of rotation 132 of disk 134B is such that it is off axis to longitudinal axis of rotation x-x at angle 138B. Without limitation, angle 138B may be between about one-half a degree and forty-five degrees, and may preferably be between about one degree and about thirty degrees, depending on the unit dimensions desired. Wave guide 151B, which is attached to collimator 125, passes through an opening or through-bore 147A in first disk 134A and an opening in or a through-bore 147 in rotator disk 130.

Second pass disk 134B supports window 168, which in turn supports reflector 165B. As shown, window 168 extends across the left end of central opening 150B in second pass disk 134B. Reflector 165B is oriented centrally on axis 132 on the surface of window 168 and aligned with reflector 166B, which is supported outside of opening 150B and window 168 on disk 134B. Reflector 166B is optically aligned parallel to rotational axis 132 with collimator 125 and perpendicular to rotational axis 132 with reflector 165B. Collimator 125 is optically aligned parallel to rotational axis 132 with reflector 166B. Opening 150B and window 168 hold reflector 165B in position with collimator 122 and reflector 166B and hence maintains alignment between collimator 122 and collimator 125. Opening 150B and window 168 also allow the first optical path P10 from collimator 121 to pass through and interface with reflector 165A and collimator 124 on disk 134A. Disk 134B includes opening 149B, through which drive pin 156 extends.

Tilted third pass disk 134C is a generally cylindrical ring-like member defined by outer cylindrical surface 142C and inner cylindrical surface 143C, both orientated about rotational axis 133. Inner cylindrical surface 143C defines central annular opening or through-bore 150C in third pass disk 134C orientated about rotational axis 133. Annular bearing 136C between inner cylindrical surface 141C of housing stator 118 and outer cylindrical surface 142C of third pass disk 134C rotationally support second pass disk 134C such that second pass disk 134C rotates about third rotational axis 133 when primary rotator disk 130 rotates about axis x-x relative to stator 118. As shown, inner cylindrical surface 141C of housing 116 and outer cylindrical surface 142C of third pass disk 134C are both orientated about rotational axis 133. As shown, bearing 136C sits in angled cylindrical bore 141C of stator 118. Bore 141C is angled 138C from inner cylindrical surface 145 of stator 118. Tilted axis of rotation 133 of disk 134C is such that it is off axis to longitudinal axis of rotation x-x at angle 138C. Without limitation, angle 138C may be between about one-half a degree and forty-five degrees, and may preferably be between about one degree and about thirty degrees, depending on the unit dimensions desired. Wave guide 151C, which is attached to collimator 126, passes through an opening or through-bore in second disk 134B, opening 147A in first disk 134A and an opening in or a through-bore 147 in rotator disk 130.

Third pass disk 134C supports window 169, which in turn supports reflector 165C. As shown, window 169 extends across the left end of central opening 150C in third pass disk 134C. Reflector 165C is oriented centrally on axis 133 on the surface of window 169 and aligned with reflector 166C, which is supported outside of opening 150C and window 169 on disk 134C. Reflector 166C is optically aligned parallel to rotational axis 133 with collimator 126 and perpendicular to rotational axis 133 with reflector 165C. Collimator 126 is optically aligned parallel to rotational axis 133 with reflector 166C. Opening 150C and window 169 hold reflector 165C in position with collimator 123 and reflector 166C and hence maintain alignment between collimator 123 and collimator 126. Opening 150C and window 169 also allow the first optical path P10 from collimator 121 and the second optical path P20 from collimator 122 to pass through and interface with reflector 165A and collimator 124 on disk 134A and reflector 165B and collimator 125 on disk 134B, respectively. Disk 134 includes opening 149C, through which drive pin 156 extends Drive pin 156 transmits the rotational movement of primary rotator disk 130 to disks 134A, 134B and 134C such that primary rotator disk 130 and disks 134A, 134B and 134C are rotationally coupled. One end of drive pin 156 sits in recess 158 of rotator 130. Drive pin 156 extends through openings in disks 134A, 134B and 134C. When rotator 130 is rotated via torque pins, it in turn rotates drive pin 156 about axis x-x, which contacts disks 134A, 134B and 134C and thereby drives each of disks 134A, 134B and 134C in the same direction and at the same speed as rotator 130 relative to body 118. When body 118 is rotated and rotator 130 is held fixed, drive pin 156 keeps disks 134A, 134B and 134C from rotating.

As rotator 130 is rotated, drive pin 156 drives first pass disk 134A and first pass disk 134A rotates about its own secondary rotational axis 131 and remains tilted by angle 138A in the same orientation over its full rotation due to angled bore 141A in stator 118. Collimator 124 and first optical path P10 rotate about secondary rotational axis 131 but remain tilted at angle 138A toward collimator 121 and hence maintain alignment with collimator 121 over the full 360 degree angular rotation of rotator 130 about central rotational axis x-x. As rotator 130 is rotated, drive pin 156 drives second pass disk 134B and second pass disk 134B rotates about its own secondary rotational axis 132 and remains tilted by angle 138B in the same orientation over its full rotation due to angled bore 141B in stator 118. Collimator 125 and second optical path P20 rotate about secondary rotational axis 132 but remain tilted at angle 138B toward collimator 122 and hence maintain alignment with collimator 122 over the full 360 degree angular rotation of rotator 130 about central rotational axis x-x. As rotator 130 is rotated, drive pin 156 drives third pass disk 134C and third pass disk 134C rotates about its own secondary rotational axis 133 and remains tilted by angle 138C in the same orientation over its full rotation due to angled bore 141C in stator 118. Collimator 126 and third optical path P30 rotate about secondary rotational axis 133 but remain tilted at angle 138C toward collimator 123 and hence maintain alignment with collimator 123 over the full 360 degree angular rotation of rotator 130 about central rotational axis x-x.

Thus, the first of the three fiber optic signals P10 is directed between collimator 121, coincident to rotation axis 131 on one side 118 of rotary interface 120, and collimator 124, parallel to rotation axis 131 on the other side 119 of rotary interface 120, the optical coupling being achieved with the use of two mirrors 165A and 166A to direct the collimated beam of light from on-axis 131 to parallel to axis 131. Axis 131 is not parallel to longitudinal axis x-x. The second of the three fiber optic signals P20 is directed between collimator 122, coincident to rotation axis 132 on one side 118 of rotary interface 120, and collimator 125, parallel to rotation axis 132 on the other side 119 of rotary interface 120, the optical coupling being achieved with the use of two mirrors 165B and 166B to direct the collimated beam of light from on-axis 132 to parallel to axis 132. Axis 132 is not parallel to either longitudinal axis x-x or rotational axis 131. The third of the three fiber optic signals P30 is directed between collimator 123, coincident to rotation axis 133 on one side 118 of rotary interface 120, and collimator 126, parallel to rotation axis 133 on the other side 119 of rotary interface 120, the optical coupling being achieved with the use of two mirrors 165C and 166C to direct the collimated beam of light from on-axis 133 to parallel to axis 133. Axis 133 is not parallel to any of longitudinal axis x-x, rotational axis 131 or rotational axis 132. Thus, when side 119 rotates relative to side 118 about axis x-x, collimators 124, 125 and 126 rotate about different non-parallel axes. The mechanical construction of fiber optic rotary joint 115 permits signals to be sent in either direction on any of optical paths P10, P20 and P30 without significant losses due to obscurations of one beam by the mechanical structure supporting the optics of the other.

On the other hand, body 18 may be rotated and rotator 130 may be held fixed. In this operation, as body 118 rotates, angle 138A of disk bore 141A keeps bearing 136A and first pass disk 134A at the correct angle 138A to maintain alignment between collimator 124 located in first pass disk 134A and collimator 121 located in body 118, angle 138B of disk bore 141B keeps bearing 136B and second pass disk 134B at the correct angle 138B to maintain alignment between collimator 125 located in second pass disk 134B and collimator 122 located in body 118, and angle 138C of disk bore 141C keeps bearing 136C and third pass disk 134C at the correct angle 138C to maintain alignment between collimator 126 located in third pass disk 134C and collimator 123 located in body 118. Drive pin 156 stops first pass disk 134A from rotating about its own rotational axis 131 and, accordingly, rotational axis 131 processes about longitudinal axis x-x and its optical path P10 traces a circle which collimator 121 tracks as body 118 rotates. Drive pin 156 stops second pass disk 134B from rotating about its own rotational axis 132 and, accordingly, rotational axis 132 processes about longitudinal axis x-x and its optical path P20 traces a circle which collimator 122 tracks as body 118 rotates. Drive pin 156 stops third pass disk 134C from rotating about its own rotational axis 133 and, accordingly, rotational axis 133 processes about longitudinal axis x-x and its optical path P30 traces a circle which collimator 123 tracks as body 118 rotates. Accordingly, optical paths P10, P20 and P30 are also provided in this alternative rotational configuration. Thus, fiber optic rotary joint 115 allows for full bidirectional transmission on three optical paths inside the rotary joint.

Fiber optic rotary joint 115 provides a non-geared, compact 3-channel fiber optic rotary non-contact connection. It is a passive and bidirectional device which can be used as a standalone device or easily integrated into a rotary assembly, enabling transfer of high date rate optical signals across a rotating interface. While a three-channel embodiment has been shown and described, a fiber optic rotary connection having more than three channels may be employed as an alternative.

The present invention contemplates that many changes and modifications may be made. Therefore, while forms of the improved rotary connection have been shown and described, and a number of alternatives discussed, persons skilled in this art will readily appreciate that various additional changes and modifications may be made without departing from the scope of the invention, as defined and differentiated by the following claims.

What is claimed is:

1. A non-contacting rotary connection for transmission of optical signals across an interface defined by two relatively-movable members comprising:
   a first rotary connection element;
   a second rotary connection element configured to rotate about a primary axis relative to said first rotary connection element;
   said second rotary connection element having a first subassembly configured to rotate about a first rotational axis with rotation of said second rotary connection element about said primary axis relative to said first rotary connection element;
   said second rotary connection element having a second subassembly configured to rotate about a second rotational axis that is not parallel to said first rotational axis with rotation of said second rotary connection element about said primary axis relative to said first rotary connection element;
   a rotary interface between said first rotary connection element and said second rotary connection element;
   said second rotary connection element comprising a first collimating lens and a second collimating lens;
   said first rotary connection element comprising a third collimating lens and a fourth collimating lens;
   said first and said third collimating lenses configured to direct an optical signal between each other in a first optical path across said rotary interface;
   said second and said fourth collimating lenses configured to direct an optical signal between each other in a second optical path across said rotary interface;
   one of said first collimating lens and said third collimating lens orientated coincident with said first rotational axis and the other of said first collimating lens and said third collimating lens orientated parallel to or coincident with said first rotational axis;
   one of said second collimating lens and said fourth collimating lens orientated coincident with said second rotational axis and the other of said second collimating lens and said fourth collimating lens orientated parallel to said second rotational axis;
   whereby an optical signal may be transmitted across said rotary interface between said first rotary connection element and said second rotary connection element in said first optical path and an optical signal may be transmitted across said rotary interface between said first rotary connection element and said second rotary connection element in said second optical path.

2. The rotary connection set forth in claim 1, wherein: said first rotary connection element is stationary relative to a housing and said second rotary connection element rotates about said primary axis relative to said first rotary connection element; or said second rotary connection element is stationary relative to a housing and said first rotary connection element rotates about said primary axis relative to said second rotary connection element.

3. The rotary connection set forth in claim 1, wherein said first rotary connection element rotates about said primary axis and said second rotary connection element rotates about said primary axis at a speed different from said first rotary connection element.

4. The rotary connection set forth in claim 1, wherein said rotary interface comprises a gap between said first and second rotary connection elements.

5. The rotary connection set forth in claim 1, wherein said first rotary connection element comprises optical fiber coupled to said fourth collimating lens and orientated coincident with said second rotational axis, said first rotary connection element comprises optical fiber coupled to said third collimating lens and orientated coincident with said first rotational axis, said second rotary connection element comprises optical fiber coupled to said first collimating lens and orientated parallel to or coincident with said first rotational axis, and said second rotary connection element comprises optical fiber coupled to said second collimating lens and orientated parallel to said second rotational axis.

6. The rotary connection set forth in claim 1, wherein:
said first subassembly of said second rotary connection element comprises a first cylindrical member having an outer bearing surface orientated about said first rotational axis;
said second subassembly of said second rotary connection element comprises a second cylindrical member having an outer bearing surface orientated about said second rotational axis; and
said second rotary connection element comprises a third subassembly comprising a driven cylindrical member having an outer bearing surface orientated about said primary axis.

7. The rotary connection set forth in claim 6, wherein said second rotary connection element comprises an axially extending linkage connecting said first cylindrical member, said second cylindrical member and said driven cylindrical member such that said first cylindrical member, said second cylindrical member and said driven cylindrical member rotate together relative to said first rotary connection element.

8. The rotary connection set forth in claim 6, wherein:
said second cylindrical member comprises a center window orientated perpendicular to said second rotational axis, a first reflector, and a second reflector supported by said window;
wherein said first optical path extends from said first collimating lens through said center window to said third collimating lens; and
wherein said second optical path extends from said second collimating lens to said first reflector, from said first reflector to said second reflector, and from said second reflector to said fourth collimating lens.

9. The rotary connection set forth in claim 1, wherein said transmission of an optical signal in said first optical path across said rotary interface has a first wavelength and said transmission of an optical signal in said second optical path across said rotary interface has a second wavelength different from or the same as said first wavelength.

10. The rotary connection set forth in claim 1, wherein said transmission of an optical signal in said first optical path across said rotary interface between said first rotary connection element and said second rotary connection element and said transmission of an optical signal in said second optical path across said rotary interface between said first rotary connection element and said second rotary connection element are simultaneous.

11. The rotary connection set forth in claim 1, wherein said transmission of an optical signal in said first optical path across said rotary interface between said first rotary connection element and said second rotary connection element and said transmission of an optical signal in said second optical path across said rotary interface between said first rotary connection element and said second rotary connection element are each bi-directional.

12. The rotary connection set forth in claim 1, wherein said second rotational axis is coincident with said primary axis and said second rotational axis diverges from said first rotational axis by an angle between about one degree and about thirty degrees.

13. The rotary connection set forth in claim 1, wherein said first collimating lens is orientated coincident with said first rotational axis and said third collimating lens is orientated coincident with said first rotational axis, whereby an optical signal may be transmitted across said rotary interface directly between said first rotary connection element and said second rotary connection element in said first optical path.

14. The rotary connection set forth in claim 1, wherein said first rotational axis is not parallel to or coincident with said primary axis and said second rotational axis is not parallel to or coincident with said primary axis.

15. The rotary connection set forth in claim 1, wherein:
said second rotary connection element comprises a third subassembly configured to rotate about a third rotational axis that is not parallel to either said first rotational axis or said second rotational axis with rotation of said second rotary connection element about said primary axis relative to said first rotary connection element;
said second rotary connection element comprises a fifth collimating lens;
said first rotary connection element comprises a sixth collimating lens;
said fifth and said sixth collimating lenses are configured to direct an optical signal between each other in a third optical path across said rotary interface;
one of said fifth collimating lens and said sixth collimating lens is orientated coincident with said third rotational axis and the other of said fifth collimating lens and said sixth collimating lens is orientated parallel to or coincident with said third rotational axis;
whereby an optical signal may be transmitted across said rotary interface between said first rotary connection element and said second rotary connection element in said third optical path.

16. The rotary connection set forth in claim 15, wherein:
said first subassembly of said second rotary connection element comprises a first cylindrical member having an outer bearing surface orientated about said first rotational axis;

said second subassembly of said second rotary connection element comprises a second cylindrical member having an outer bearing surface orientated about said second rotational axis;
said second subassembly of said second rotary connection element comprises a third cylindrical member having an outer bearing surface orientated about said third rotational axis; and
said second rotary connection element comprises a driven subassembly comprising a driven cylindrical member having an outer bearing surface orientated about said primary axis.

17. The rotary connection set forth in claim 16, wherein said second rotary connection element comprises an axially extending linkage connecting said first cylindrical member, said second cylindrical member, said third cylindrical member and said driven cylindrical member such that said first cylindrical member, said second cylindrical member, said second cylindrical member and said driven cylindrical member rotate together relative to said first rotary connection element.

18. The rotary connection set forth in claim 16, wherein:
said first cylindrical member comprises a first center window orientated perpendicular to said first rotational axis, a first reflector, and a second reflector supported by said first window, and said first optical path extends from said first collimating lens to said first reflector, from said first reflector to said second reflector, and from said second reflector to said third collimating lens;
said second cylindrical member comprises a second center window orientated perpendicular to said second rotational axis, a third reflector, and a fourth reflector supported by said second window, and said second optical path extends from said second collimating lens to said third reflector, from said third reflector to said fourth reflector, and from said fourth reflector to said fourth collimating lens;
said third cylindrical member comprises a third center window orientated perpendicular to said third rotational axis, a fifth reflector, and a sicth reflector supported by said third window, and said third optical path extends from said fifth collimating lens to said fifth reflector, from said fifth reflector to said sixth reflector, and from said sixth reflector to said sixth collimating lens;
said first optical path extends from said first collimating lens through said second center window and said third center window to said third collimating lens; and
said second optical path extends from said second collimating lens through said third center window to said fourth collimating lens.

19. A non-contacting rotary connection for transmission of optical signals across an interface defined by two relatively-movable members comprising:
a first rotary connection element;
a second rotary connection element configured to rotate relative to said first rotary connection element;
said second rotary connection element having a first subassembly configured to rotate about a first rotational axis with rotation of said second rotary connection element relative to said first rotary connection element;
said second rotary connection element having a second subassembly configured to rotate about a second rotational axis that is not parallel to said first rotational axis with rotation of said second rotary connection element relative to said first rotary connection element;
a rotary interface between said first rotary connection element and said second rotary connection element;
said second rotary connection element comprising a first collimating lens and a second collimating lens;
said first rotary connection element comprising a third collimating lens and a fourth collimating lens;
said first and said third collimating lenses configured to direct an optical signal between each other in a first optical path across said rotary interface;
said second and said fourth collimating lenses configured to direct an optical signal between each other in a second optical path across said rotary interface;
one of said second collimating lens and said fourth collimating lens orientated coincident with said first rotational axis and the other of said second collimating lens and said fourth collimating lens orientated parallel to said first rotational axis;
one of said first collimating lens and said third collimating lens orientated coincident with said second rotational axis and the other of said first collimating lens and said third collimating lens orientated coincident with said second rotational axis;
whereby an optical signal may be transmitted across said rotary interface directly between said first rotary connection element and said second rotary connection element in said first optical path and an optical signal may be transmitted across said rotary interface between said first rotary connection element and said second rotary connection element in said second optical path.

20. The rotary connection set forth in claim 19, wherein:
said first subassembly of said second rotary connection element comprises a first cylindrical member having an outer bearing surface orientated about said first rotational axis;
said second subassembly of said second rotary connection element comprises a second cylindrical member having an outer bearing surface orientated about said second rotational axis;
said second rotary connection element comprises a third subassembly comprising a driven cylindrical member having an outer bearing surface orientated about said first rotational axis;
said second rotary connection element comprises an axially extending linkage connecting said first cylindrical member, said second cylindrical member and said driven cylindrical member such that said first cylindrical member, said second cylindrical member and said driven cylindrical member rotate together relative to said first rotary connection element;
said first cylindrical member comprises a center window orientated perpendicular to said first rotational axis, a first reflector, and a second reflector supported by said window;
said first optical path extends from said first collimating lens through said center window to said third collimating lens; and
said second optical path extends from said second collimating lens to said first reflector, from said first reflector to said second reflector, and from said second reflector to said fourth collimating lens.

\* \* \* \* \*